US012566493B2

(12) United States Patent
Katz

(10) Patent No.: US 12,566,493 B2
(45) Date of Patent: Mar. 3, 2026

(54) METHODS AND SYSTEMS FOR EYE-GAZE LOCATION DETECTION AND ACCURATE COLLECTION OF EYE-GAZE DATA

(71) Applicant: Amplio Learning Technologies Holdings LLC., Wilmington, DE (US)

(72) Inventor: Aric Katz, Haifa (IL)

(73) Assignee: Amplio Learning Technologies Holdings LLC., Wilmington, DE (US)

( * ) Notice: Subject to any disclaimer, the term of this patent is extended or adjusted under 35 U.S.C. 154(b) by 316 days.

(21) Appl. No.: 18/221,227

(22) Filed: Jul. 12, 2023

(65) Prior Publication Data

US 2024/0019931 A1 Jan. 18, 2024

Related U.S. Application Data

(60) Provisional application No. 63/388,760, filed on Jul. 13, 2022.

(51) Int. Cl.
| | |
|---|---|
| *G06F 3/01* | (2006.01) |
| *G06T 7/70* | (2017.01) |
| *G06V 10/25* | (2022.01) |
| *G06V 40/16* | (2022.01) |
| *G10L 15/02* | (2006.01) |

(52) U.S. Cl.
CPC ................ *G06F 3/013* (2013.01); *G06T 7/70* (2017.01); *G06V 10/25* (2022.01); *G06V 40/161* (2022.01); *G10L 15/02* (2013.01); *G06T 2207/30201* (2013.01); *G10L 2015/025* (2013.01)

(58) Field of Classification Search
None
See application file for complete search history.

(56) References Cited

U.S. PATENT DOCUMENTS

| | | | | |
|---|---|---|---|---|
| 4,950,069 A | * | 8/1990 | Hutchinson | ............ G06V 40/19 396/51 |
| 11,619,993 B2 | * | 4/2023 | Sharma | ............ G06F 18/24133 345/157 |

(Continued)

OTHER PUBLICATIONS

Sinha et al., "Eyegaze Tracking In Handheld Devices," 2018 Fifth International Conference on Emerging Applications of Information Technology (EAIT), Kolkata, India, 2018, pp. 1-5, doi: 10.1109/EAIT.2018.8470402 (Year: 2018).*

*Primary Examiner* — Michelle M Koeth
(74) *Attorney, Agent, or Firm* — The Roy Gross Law Firm, LLC; Roy D. Gross

(57) ABSTRACT

Disclosed herein are methods and system for eye-gaze location detection and accurate collection of eye-gaze data from low resolution, low frame rate cameras. The method includes calibrating a machine learning model by constraining an area of interest to a single axis. Presenting to the user one or more lines of words and/or images on a screen, capturing by a camera one or more images of the user's eye-gaze, looking at said lines of words and/or images, applying the calibrated machine learning model on the one or more images of the user's eye-gaze, constraining the area of interest to a single-axis, and detecting an eye-gaze location on the screen with a word-level accuracy. The method further includes combining eye-gaze and audio data collection by measuring a time difference between a first time-stamp of a word eye-gaze location detection and a second timestamp of the word first phoneme pronunciation by a user.

17 Claims, 6 Drawing Sheets

(56) References Cited

U.S. PATENT DOCUMENTS

| | | | |
|---|---|---|---|
| 2014/0226131 A1* | 8/2014 | Lopez | G06F 21/31 |
| | | | 351/210 |
| 2020/0364539 A1* | 11/2020 | Anisimov | G06F 3/011 |
| 2022/0300072 A1* | 9/2022 | Arar | G06F 18/2148 |

* cited by examiner

100

301

Capturing eye-gaze image/s

302

Applying a first machine learning model calibrated on x-axis

Applying a second machine learning model calibrated on y-axis

303

Combining the results of the first and second machine learning models

Detecting the eye-gaze location on the screen          304

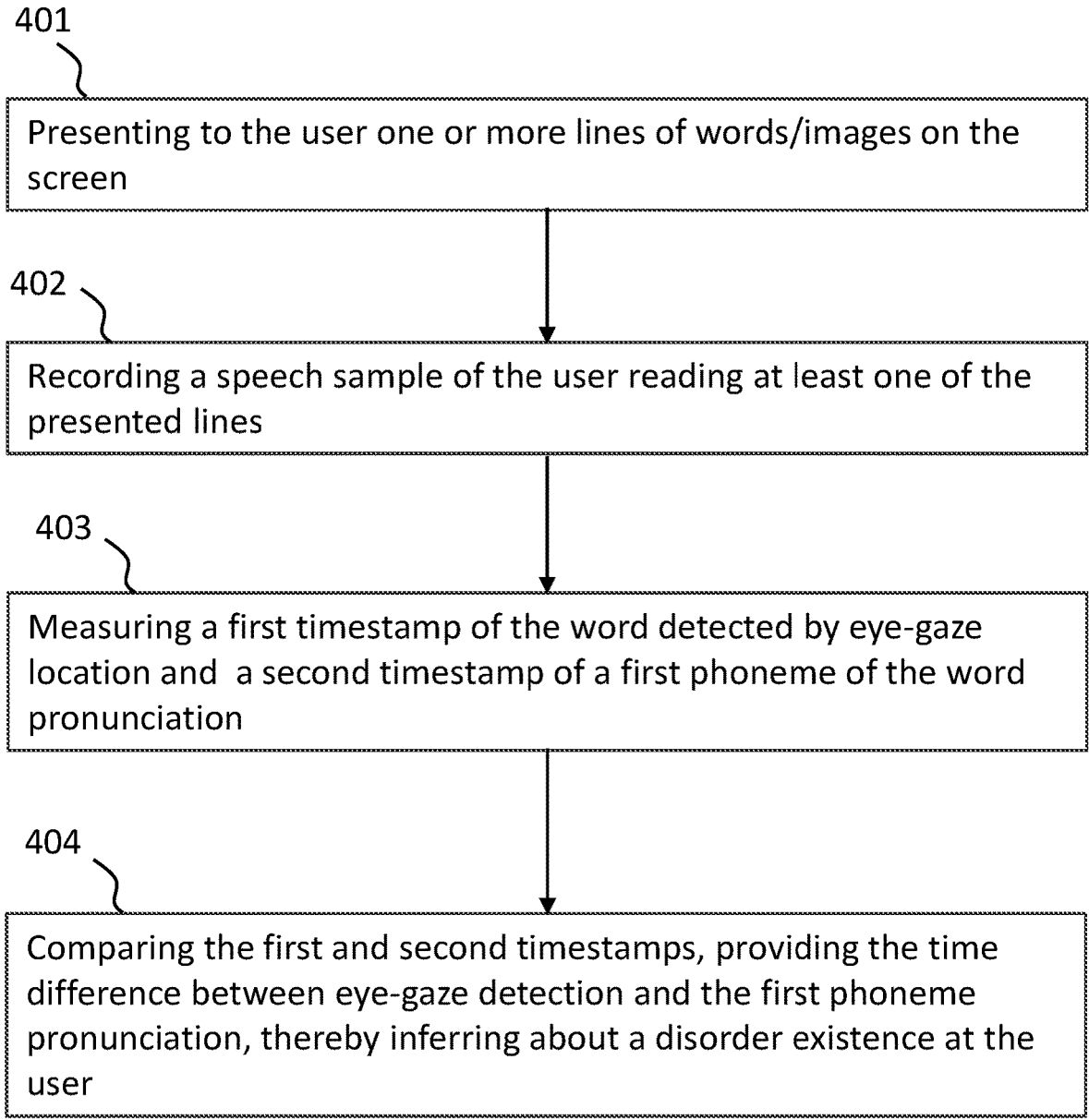

401

Presenting to the user one or more lines of words/images on the screen

402

Recording a speech sample of the user reading at least one of the presented lines

403

Measuring a first timestamp of the word detected by eye-gaze location and a second timestamp of a first phoneme of the word pronunciation

404

Comparing the first and second timestamps, providing the time difference between eye-gaze detection and the first phoneme pronunciation, thereby inferring about a disorder existence at the user

Eye glaze monoticity score (EGMS): 70%
*Measured by linear regression $R^2$

Words in utterance

Word decoding and planning time (WDPT)

METHODS AND SYSTEMS FOR EYE-GAZE LOCATION DETECTION AND ACCURATE COLLECTION OF EYE-GAZE DATA

CROSS REFERENCE TO RELATED APPLICATIONS

This application claims priority to U.S. 63/388,760 filed Jul. 13, 2023, the contents of which are incorporated herein by reference in their entirety.

TECHNICAL FIELD

The present disclosure relates generally to methods and systems for eye-gaze location detection and collecting eye-gaze data.

BACKGROUND

Eye-gaze data collection is the process of measuring the movement and/or position of the eyes. These data can be utilized in a variety of fields, such as human-computer interaction, marketing and product design and the like. Further, the measurement of eye-gaze may enable diagnosis and monitoring of neurological and neuropsychiatric disorders, by serving as a noninvasive "window" to the brain function.

Currently, acquiring high accuracy of the eye-gaze data is based a combination of an expensive hardware, and advanced software implementing machine learning models. Although advances in computer vision and machine learning algorithms increased the accuracy of the acquired data, they are typically applied on high frame rate, high resolution, custom-made and expensive cameras, that may also include additional ultra-red light projected on the eyes. Moreover, most frameworks require a tedious setup process for the system calibration.

There is, therefore, a need in the art for methods and systems enabling accurate eye-gaze location detection and collection of eye-gaze data using standard and low-end cameras, as commonly used in smartphones and as standard web cameras.

SUMMARY

Aspects of the disclosure, according to some embodiments thereof, relate to methods for collecting eye-gaze data. More specifically, but not exclusively, aspects of the disclosure, according to some embodiments thereof, relate to methods for collecting accurate eye-gaze data using low resolution and low frame rate cameras. According to some embodiments, the methods for collecting accurate eye-gaze data may be performed on standard devices, such as but not limited to mobile phone, by installing and using an application by an end user.

According to some embodiments, there are provided herein methods for eye-gaze location detection and collecting accurate eye-gaze data from low resolution and low frame rate cameras. Advantageously, the disclosed herein methods allow accurate eye-gaze data collection using existing low-cost, hardware of most existing devices, such as but not limited to, web cameras of laptops, smartphones, tablets, and the like. It is noted that accurate eye-gaze location detection and accurate eye-gaze data collection is possible in existed systems only with high resolution, high frame rate cameras or with custom made solutions for dedicated hardware. These systems may be highly accurate and may require a calibration stage of only one point, however, they are expensive and work for specific devices only.

Advantageously, according to some embodiments, the disclosed herein methods support most devices via a web interface. According to some embodiments, the disclosed herein methods support exiting devices by installing a dedicated application. According to some embodiments, the disclosed herein methods are compatible with future framework improvements/upgrades or any other software changes, thereby further increasing the accuracy of the disclosed methods.

Advantageously, the disclosed herein methods for eye-gaze location detection and for accurate eye-gaze data collection reduce the calibration/setup time, which, in turn, increases the efficiency thereof. According to some embodiments, the disclosed herein methods enable new levels of granularity for the eye-gaze measurements, providing a word-level analysis.

According to some embodiments, the herein disclosed method is based on constraining the area of interest of the eye-gaze location detection to a single axis. Typically, in existed methods and systems for eye-tracking and eye-gaze location detection the area of interest is two-dimensional, usually relating to the x-axis and y-axis together. Advantageously, according to some embodiments, constraining the area of interest to a single axis, improves the accuracy of the results and allows to use low-cost cameras such as low resolution and low frame-rate cameras, yet keeping a high level of accuracy of a word-level.

In one aspect, a method for eye-gaze location detection is presented. The method comprises the steps of:

calibrating a machine learning model trained to receive one or more images of an eye-gaze of a user on a screen and detect the eye-gaze location on the screen, by constraining an area of interest to a single axis, wherein calibrating the machine learning model comprising:

presenting to a user a plurality of single-axis calibration points on a screen.

for each calibration point:

capturing by a camera at least one image of the user's eye-gaze looking at the calibration point;

providing the at least one image to the machine learning model, thereby calibrating the machine learning model to be constrained to a single-axis area of interest;

presenting to the user one or more lines of words and/or images on the screen;

capturing by the camera one or more images of the user's eye-gaze, looking at said lines of words and/or images;

applying the calibrated machine learning model on the one or more images of the user's eye-gaze, constraining the area of interest to a single-axis; and detecting an eye-gaze location on the screen with a word-level accuracy.

According to some embodiments, the machine learning model is trained by receiving a plurality of images of eye-gazes at different locations on the screen, taken from a plurality of users, in different lighting conditions.

According to some embodiments, capturing at least one image of the user's eye-gaze looking at the calibration point further include capturing additional facial posture.

According to some embodiments, the machine learning model is configured to be trained on two-dimensional data.

According to some embodiments, the machine learning model is configured to be trained on a single-axis data.

According to some embodiments, the word-level accuracy is between 2-3 cm.

According to some embodiments, the method further comprises:

calibrating a first machine learning model with x-axis calibration points and a second machine learning model with y-axis calibration points;

applying the first and second calibrated machine learning in parallel; and combining the detected eye-gaze locations from each machine learning model to one detected eye-gaze location, thereby receiving an eye-gaze location detection on the screen with an increased accuracy.

According to some embodiments, the first machine learning model is configured to be trained on the x-axis and the second machine learning model is configured to be trained on the y-axis.

According to some embodiments, the camera is a low resolution and low frame rate camera.

According to some embodiments, the camera is a web camera.

According to some embodiments, the method further comprises combining eye-gaze and audio data collection, comprising the steps of:

presenting a text to the user with a plurality of lines of words and/or images;

recording a speech sample of the user reading at least one of the presented lines;

measuring a timestamp of a word detected by the eye-gaze location, and a timestamp of a first phoneme of the word pronunciation; and comparing the first and second timestamps of the word, providing the time difference between eye-gaze detection and the first phoneme pronunciation, thereby allowing inferring and/or detecting regression disorders.

According to some embodiments, the regression disorders are ADD or ADHD dyslexia, Reading Comprehension Deficits, Visual Processing Disorders, Reading Speed and Fluency Issues.

According to some embodiments, the method further comprises the step of detecting face position by a facial posture framework and providing the face position as an input to the machine learning model, instead of the step of calibrating the machine learning model.

In another aspect, a system for eye-gaze detection id presented. The system, comprises:

a screen;

a camera for capturing images of a user's eye-gaze looking at the screen; and a processor executing a code configured to:

calibrate a machine learning model trained to receive one or more images of an eye-gaze of a user on a screen and detect the eye-gaze location on the screen, by constraining an area of interest to a single axis, wherein calibrate the machine learning model comprising:

presenting to a user a plurality of single-axis calibration points on a screen;

for each calibration point:

capturing by a camera at least one image of the of the user's eye-gaze looking at the calibration point; and providing the at least one image to the machine learning model, thereby calibrating the machine learning model to be constrained to a single-axis area of interest;

present to the user one or more lines of words and/or images on the screen;

capture by the camera one or more images of the user's eye-gaze, looking at said lines of words and/or images;

apply the calibrated machine learning model on the one or more images of the user's eye-gaze, constraining the area of interest to a single-axis; and detect an eye-gaze location on the screen with a word-level accuracy.

According to some embodiments, the processor further executes a code for combining eye-gaze and audio data collection, the code is configured to:

present a text to the user with a plurality of lines of words and/or images;

record a speech sample of the user reading at least one of the presented lines;

measure a timestamp of a word detected by the eye-gaze location, and a timestamp of a first phoneme of the word pronunciation; and compare the first and second timestamps of the word, providing the time difference between eye-gaze detection and the first phoneme pronunciation, thereby allowing inferring and/or detecting regression disorders.

According to some embodiments, the system further comprises a facial posture framework for detecting face position wherein the code is configured to receive the face position as an input to the machine learning model, instead of calibrating the machine learning model.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

Figure 1:
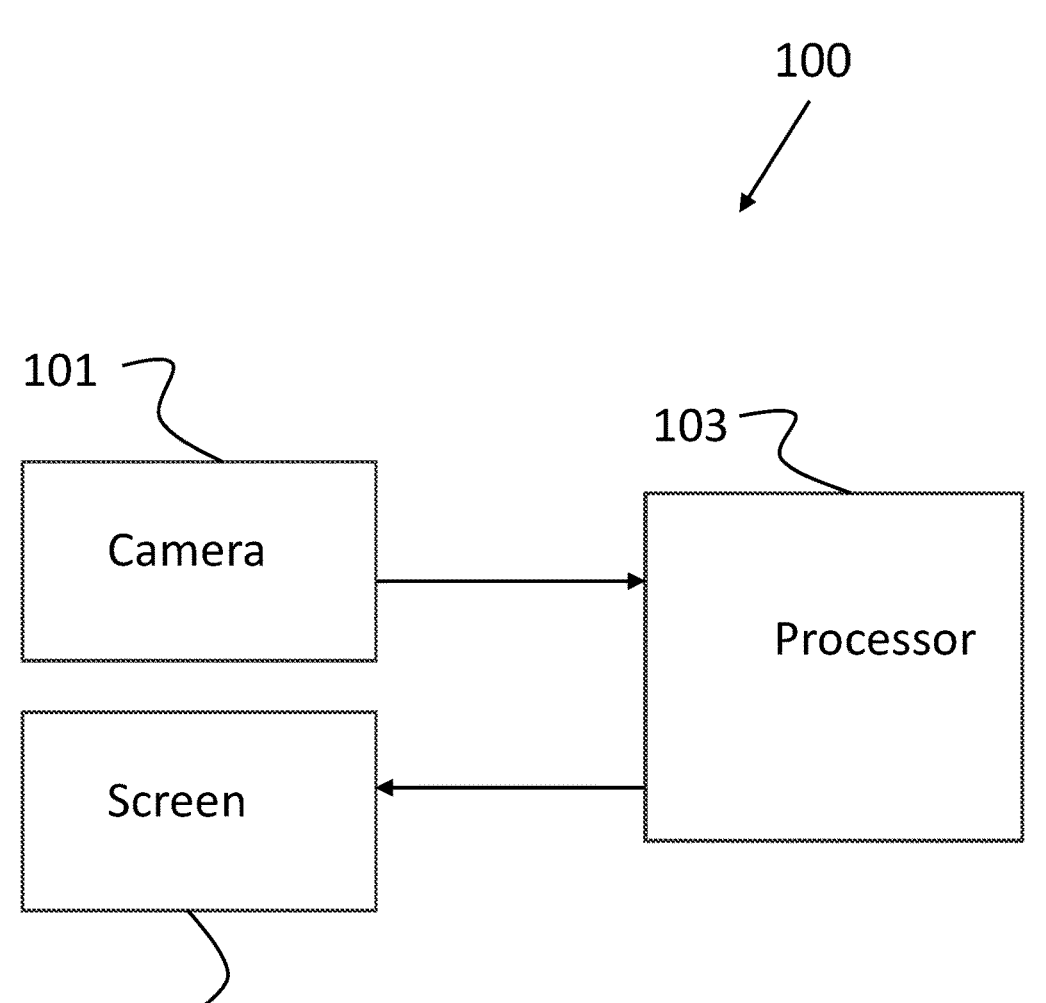
Figure 2:
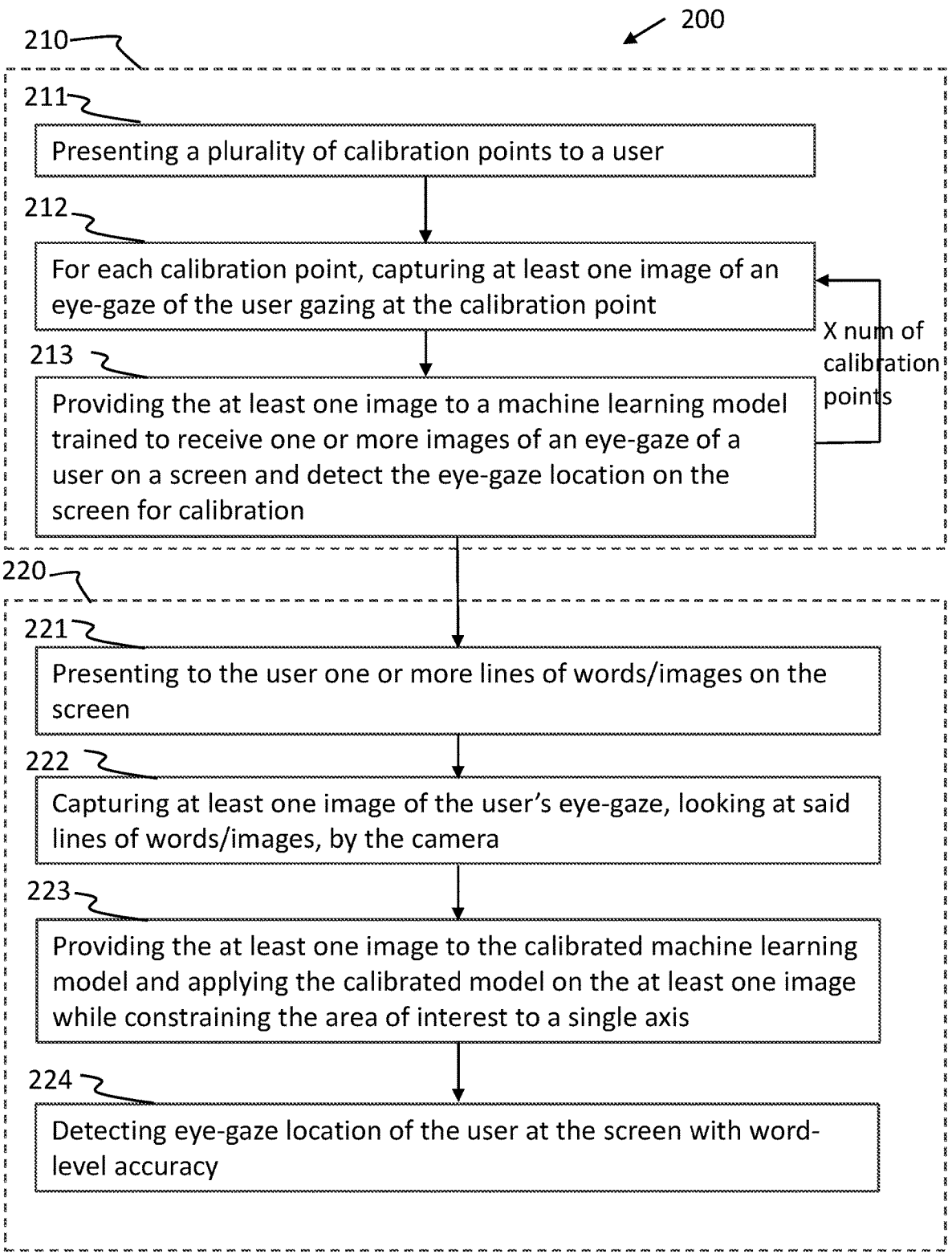
Figure 3:
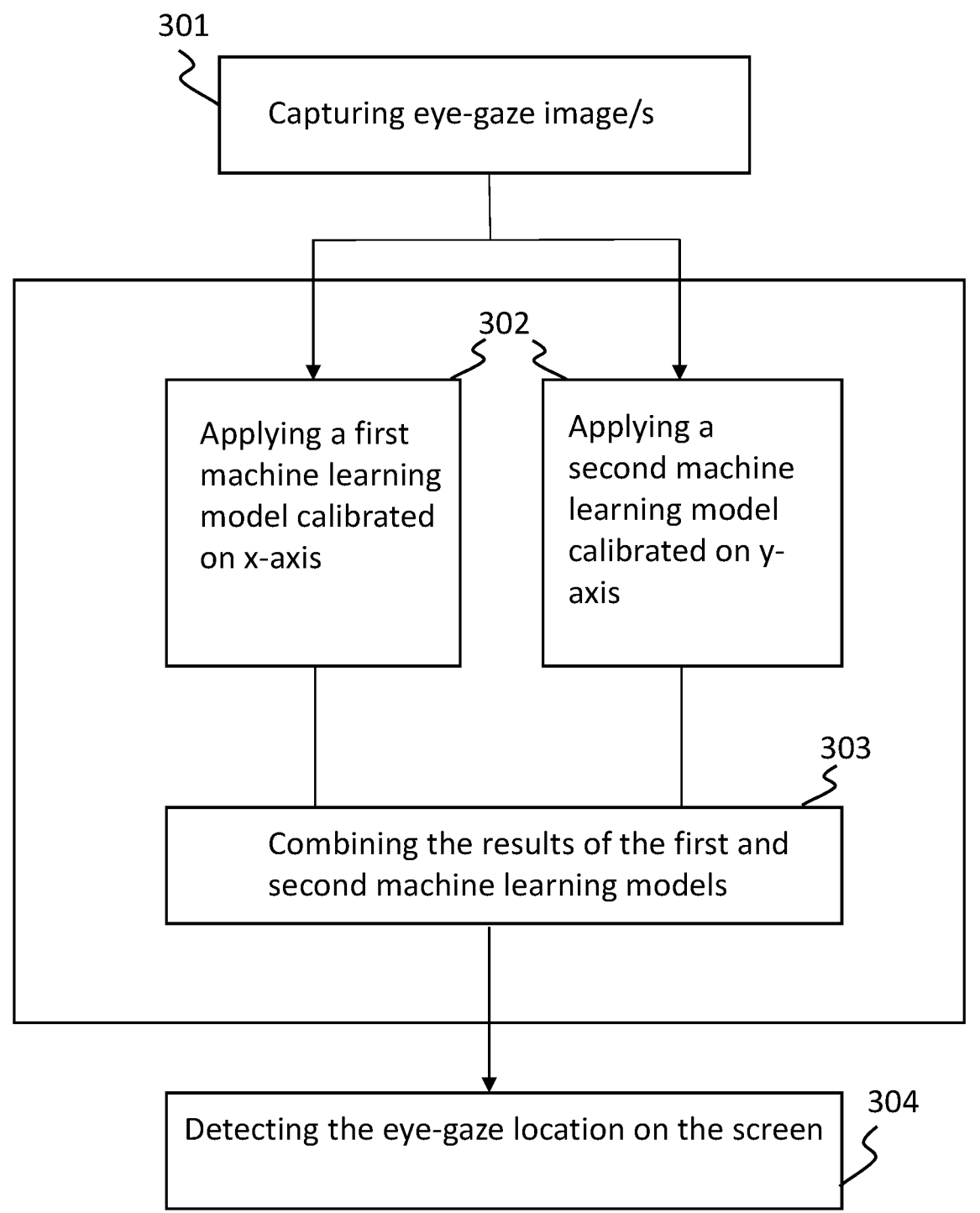
Figure 5:
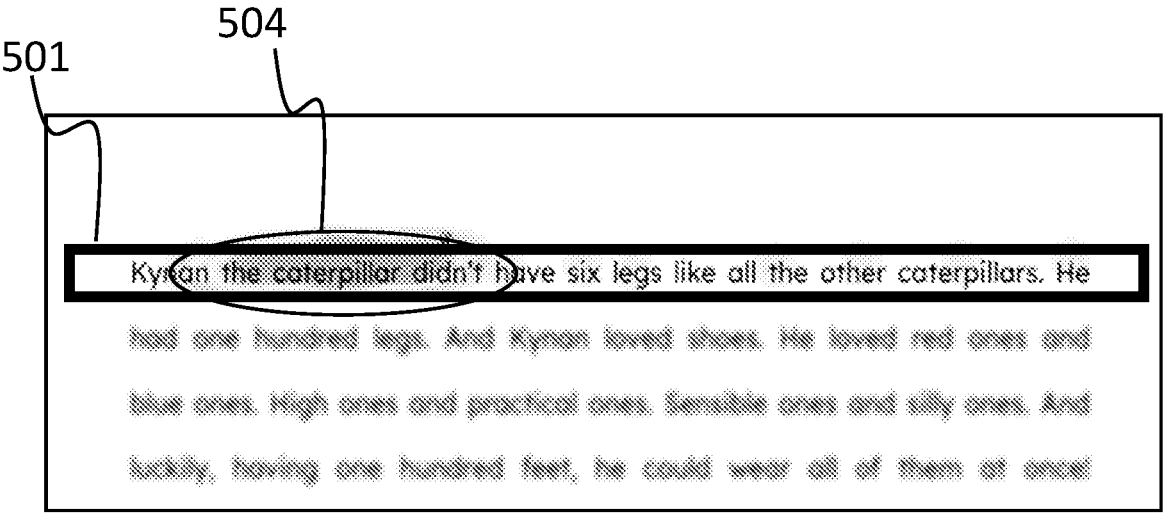
Figure 6A:
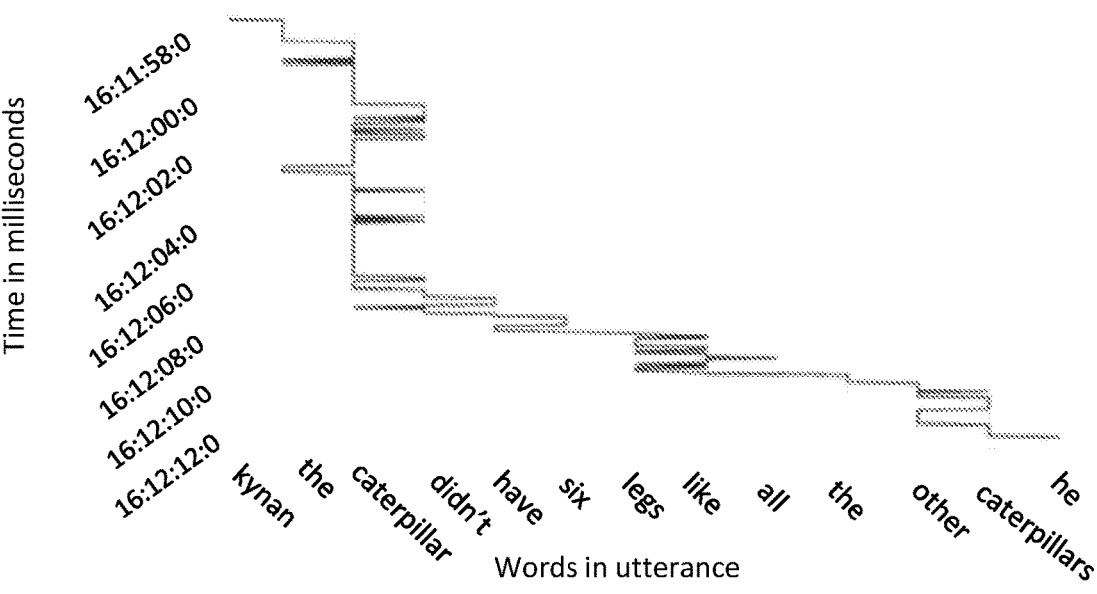
Figure 6B:
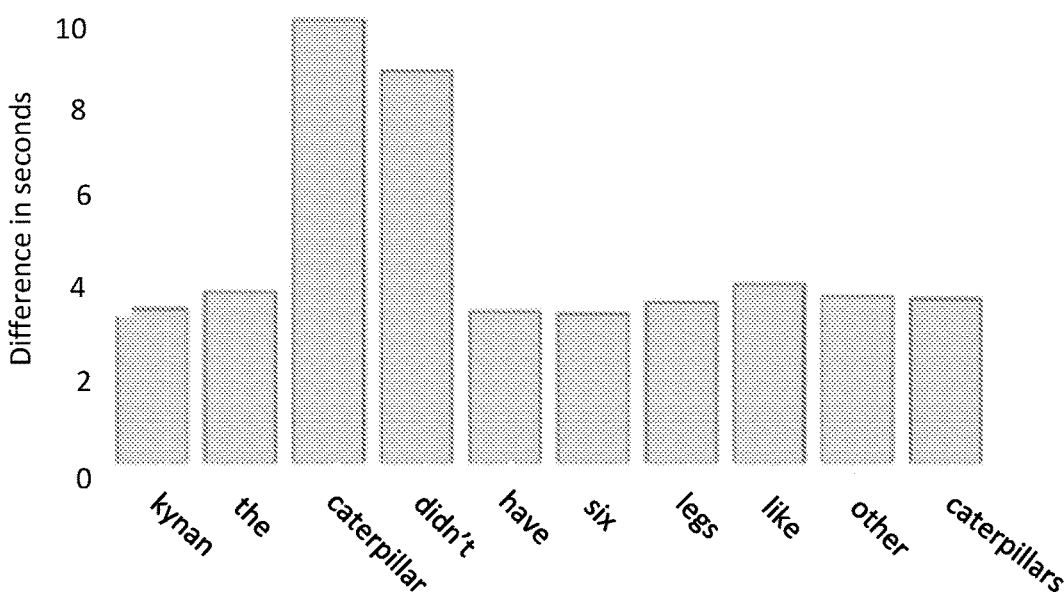

In the figures:

FIG. 1 schematically shows a block diagram of a system for eye-gaze detection and collection of accurate eye-gaze data, according to some embodiments;

FIG. 2 schematically shows a flow chart of a method for eye-gaze detection and collection of accurate eye-gaze data, according to some embodiments;

FIG. 3 schematically shows a flow chart of a method for eye-gaze location detection, applying a first machine learning model calibrated with a single line of interest of the x-axis and a second machine learning model calibrated with a single line of interest of the y-axis, according to some embodiments;

FIG. 4 schematically shows a flow-chart of a method for collecting eye-gaze data in combination with audio recording, according to some embodiments;

FIG. 5 schematically shows an example of a disclosed herein method for collecting eye-gaze data, according to some embodiments;

FIGS. 6A-6B schematically present examples of measurements which may be generated based on the eye-gazed and audio collected data, according to some embodiments, where FIG. 6A shows a graph of an eye-gaze monotonicity score, according to some embodiments and FIG. 6B shows a graph of word decoding and planning times, according to some embodiments.

DETAILED DESCRIPTION

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g., the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, there are provided herein methods for eye-gaze detection and collection of accurate eye-gaze data using low resolution and low frame rate cameras. Advantageously, the methods disclosed herein enable collecting word-level accuracy of the eye-gaze data using existing hardware of most existing devices, such as but not limited to, web cameras of laptops, smartphones, tablets, and the like. According to some embodiments, the methods disclosed herein support most devices via web interface. According to some embodiments, the methods disclosed herein support exiting devices by installing a dedicated application. According to some embodiments, the methods disclosed herein are compatible with future framework improvements/upgrades or any other software changes, thereby further increasing the accuracy of the disclosed methods.

According to some embodiments, the disclosed systems and methods are based on constraining the area of interest to a single axis, for example to a single line on the x-axis. According to some embodiments, releasing the y-axis tracking constrain, dramatically increases the accuracy of the collected eye-gaze data, due to the known lower accuracy of the y-axis tracking. According to some embodiments, tracking the eye-gaze data from a single row of interest (e.g., on the x-axis) advantageously enables a much shorter and more efficient calibration/setup process.

According to some embodiments, the methods include accommodation of the application to a region of interest.

FIG. 1 schematically shows a block diagram of a system for eye-gaze detection and collection of accurate eye-gaze data, according to some embodiments. System 100 includes a camera 101, a screen 102 and a processor 103. According to some embodiments, processor 103 executes a calibration code configured to calibrate a machine learning model. According to some embodiments, the machine learning model is trained to receive a plurality of images of eye-gazes at different locations on the screen, taken from a plurality of users, in different lighting conditions and to match coordinates of a point on the screen to a received facial image of an eye-gaze. According to some embodiments, the training may be on different sizes of screens of different devices. For example, different sizes of smartphone screens, different sizes of tablet screens, different sizes of laptop screens and the like. The calibration stage includes presenting to a user a plurality of calibration points on screen 102. The calibration points are generated to be on an area of interest of a single axis. For example, on a single line on the x-axis. For each calibration point, camera 101 is configured to capture at least one image of the user's eye-gaze when looking at the calibration point and provide the at least one image to the machine learning model. According to some embodiments, after the machine learning model is calibrated, processor 103 executes a code configured to present on screen 102 a line of words or images. Camera 101 is configured to capture at least one image of the user's eye-gaze looking at screen 102 while the line of words or images is presented. The code is configured to apply the calibrated machine learning model on the at least one image wherein the constraining the area of interest of a single axis, such as the x-axis. The machine learning model detects the eye-gaze location on screen 102 with a word-level accuracy, i.e., the word (or image) the user is looking at is identified. According to some embodiments, the accuracy of the detection may be in a range of 2-3 cm. According to some embodiment the detected eye-gaze location may be marked and/or highlighted on screen 102. Advantageously, according to some embodiments, camera 101 may be a simple and/or standard camera with low resolution and low frame rate, such as a web camera, a mobile device camera and the like.

According to some embodiments, the machine learning model may be trained on an area of interest of two-dimensional axis, such as the x-axis and y-axis. According to some other embodiments, the machine learning model may be trained on an area of interest of a single axis, for example on a single line of the x-axis or of the y-axis. In this case, the accuracy of the detection of eye-gaze and of the eye-gaze data collected is increased. According to some embodiments, in this case where the machine learning model is trained on an area of interest of a single axis, the machine learning model may be trained on several different areas of interest of the x-axis or of the y-axis, to achieve a full screen coverage. For example, for the x-axis, the area of interest on the screen may be divided to three regions: top, center and bottom, and extrapolation \ interpolation may be used for the regions in between.

According to some embodiments, the machine learning model may be an artificial intelligence (AI) model, using guided learning or unguided learning. The machine learning model may comprise decision trees, neural networks, statistical models, or a combination thereof. For example, K-Nearest Neighbors (KNN), Support Vector Machine (SVM), random forest, artificial neural networks (ANN), genetic programming (GP), linear and non-liner discriminative analysis (LDA), Adaptive boosting (ADA-Boost), logistic regression, linear of non-linear Kernals, or any combination thereof.

According to some embodiments, two machine learning models may be used. In this case, a first machine learning model is calibrated with calibration points generated to be on an area of interest of a single line on the x-axis, and a second model calibrated with calibration points generated to be on an area of interest of a single line on the y-axis. Then, in the inference stage, processor 103 executes a code configured to present on screen 102 a line of words or images on the x-axis. Camera 101 is configured to capture at least one image of the user's eye-gaze looking at screen 102 while the line of words or images is presented. The code is configured to apply the first calibrated machine learning model on the at least one image. In addition, processor 103 executes a code configured to present on screen 102 a column of words or images on the y-axis. Camera 101 is configured to capture at least one image of the user's eye-gaze looking at screen 102 while the column of words or images is presented. The code is configured to apply the second calibrated machine learning model on the at least one image. The results of both models are combined to detects the eye-gaze location on screen 102 with a higher accuracy level.

Reference is now made to FIG. 2, which schematically shows a flow chart of a method for eye-gaze detection and collection of accurate eye-gaze data, according to some embodiments. Method 200 includes a calibration stage 210 and an inference stage 220. At step 211 of the calibration stage 210, a plurality of calibration points are presented to a user on screen 102. Processor 103 executes a code configured to generate the plurality of calibration points which are on an area of interest of a single axis. For example, on a single line on the x-axis. The plurality of calibration points may be for example, 3-5 points, 6-10 points 11-15 points or more. At step 212 of the calibration stage, for each calibration point, at least one image of the user's eye-gaze when looking at the calibration point is captured by camera 101. According to some embodiments, to ease the identification of the eye-gaze at the presented point, the user may be requested to click on the presented calibration point for example by using with a mouse, or by using a touch screen or the like. In this case the calibration point may be presented as a button the user needs to click on. In this case, once the user clicks the button, camera 101 captures at least one image of the user's eye-gaze. At step 213 the at least one image is provided to the machine learning model, which was trained to receive one or more images of an eye-gaze of a user on a screen and detect the eye-gaze location on the screen, for calibration. According to some embodiments the machine learning model is a trained model. According to some embodiments, the model may be trained on an area of interest of two-dimensional axis, such as the x-axis and y-axis. According to some other embodiments, the machine learning model may be trained on an area of interest of a single axis, for example on a single line of the x-axis. In this case, the accuracy of the detection of eye-gaze and of the eye-gaze data collected is increased.

According to some embodiments, the training of the machine learning model may be implemented for optimizing the eye-gaze data collection based only on the x-axis tracking. According to some embodiments, the x-axis training may be performed on different y-axis regions of the screen, covering relevant y-axis points. Thereby, in some embodiments, leading to a more general eye-tracking model. According to some embodiments, a separate y-axis trained machine learning model may be used for loading the relevant x-axis model based on the y-axis position.

According to some embodiments, after the machine learning model is calibrated, the inference stage 220 is applied. At step 221 of inference stage 220, a line of words is presented to the user and at step 222 at least one image of the user's eye-gaze looking at the line of words is captured by camera 101. At step 223, the at least one image is provided to the calibrated machine learning model as an input and the calibrated machine learning model is applied on the at least one image while constraining the area of interest to a single axis, for example to the x-axis. The constrain may be for example by extracting only the x coordinates results while ignoring the y coordinate results.

According to some embodiments, additionally or alternatively, two machine learning models may be used and applied in parallel during step 223. A first machine learning model trained on the x-axis and a second machine learning model trained on the y-axis. The combination of both machine learning models results, may increase the accuracy of the eye-gaze location detection to more than a word-level accuracy. Advantageously, achieving such an accuracy level using low resolution, low frame rate camera, such as a web camera or any standard camera saves cost and allows using the method without using special dedicated hardware such as high resolution and high frame rate cameras.

In step 224, according to some embodiments, the calibrated machine learning model detects the eye-gaze location on screen 102 and provides the location of the eye-gaze. According to some embodiments the eye-gaze location may be marked up on screen 102, for example by highlighting the word the user is looking at, in the line of words presented to the user. According to some embodiments, another way of presenting the detected location of the eye-gaze of the user may be by generating and presenting a heat map of the eye-gazing of the user, highlighting the word the user's gazes at with warm colors such as red, pink, orange and the like, while words that the user does not looking at are highlighted with cold colors such as blue, purple and the like.

Reference is now made to FIG. 3, which schematically shows a flow chart of a method for eye-gaze location detection, applying a first machine learning model calibrated with a single line of interest of the x-axis and a second machine learning model calibrated with a single line of interest of the y-axis, according to some embodiments. In step 301 at least one image of an eye-gaze of a user looking at screen 102 is captured by camera 101. At step 302 the at least one image is provided to the first machine learning model calibrated on the x-axis and to the second machine learning model calibrated on the y-axis, and both machine learning models are applied in parallel. In step 303 the results of the first and second machine learning models are combined and at step 304 the eye-gaze location on the screen is detected. According to some embodiment, applying two machine learning models calibrated each on a different single line of interest such as the x-axis and the y-axis increases the accuracy of the eye-gaze location detection. According to some embodiments, the first and second machine learning model may be trained each on a different single line of interest, for example the first machine learning model may be trained on the x-axis and the second machine learning model may be trained on the y-axis. In this case, according to some embodiments, the first machine learning model may be trained on several different areas of interest of the x-axis and the second machine learning model may be trained on several different areas of interest of the y-axis, to achieve a full screen coverage. For example, for the x-axis, the area of interest on the screen may be divided to three regions of top, center and bottom, and extrapolation \ interpolation may be used for the regions in between, And for the y-axis the area of interest on the screen may be divided to three regions of right side, center and left side, and extrapolation \ interpolation may be used for the regions in between.

According to some embodiments, the first and second machine learning models may be trained on a two-dimensional area of interest, i.e., each one of the models may be trained on a two-dimensional area of interest.

According to some embodiments, the training of each of the first and second machine learning models may be done on several different sizes of screens, small screen such as a smartphone screen, middle-size such as a tablet screen, large screen such as a laptop screen and the like.

According to some embodiments, the method may include combining eye-gaze tracking with audio recording, hence acquiring, and producing new types of information about an end user. As a non-limiting example, a new measure is developed for tracking word decoding times, based on the time difference between the timestamp of a single word gaze detection and a timestamp of a first phoneme pronunciation of the word.

According to some embodiments, FIG. 4 schematically shows a flow-chart of a method for collecting eye-gaze data in combination with audio recording, according to some embodiments. At step 401, a text is presented to the user on screen 102, with lines of words, and the eye-gaze of the user on the screen is detected, providing the word the user is looking at. At step 402, a speech sample of the user reading the whole text or at least reading one line of the text is recorded. According to some embodiments, the text may be presented to the user while marking a specific line in the text and blurring the rest of the text to ease the detection of the word the user id looking at. At step 403, a first timestamp of the eye-gaze detection word location is measured. At step 404 a second timestamp of the first phoneme pronunciation of the word is measured. At step 405, the first and second timestamps are compared to provide the time difference between the eye-gaze location detection and the first phoneme pronunciation, thereby allowing inferring about one or more disorders existence at the user. According to some embodiments step 404 of the analysis of the speech sample record is done after the recording. According to some other embodiments the analysis and measurements taken in step 404 may be done in real time. According to some embodiments, the analysis may be done for each word or line in real time.

An example for using the herein disclosed method is presented. In the example, a reading activity is performed by an end user. According to some embodiments, the end user reads several sections of text and the time of word detection is measured and the time of word pronunciation is also measured. According to some embodiments, shifting the lines of the text (i.e., presenting the next line, is based on the audio or eye-gaze detection of the last word in the current line being read by the end user. According to some embodiments, the method includes reading aloud a single line (e.g., a single row tracking region) by the end user. According to some embodiments, the method includes generating a heat map of an eye-gazing area by audio and/or eye-gaze detection. FIG. 5 schematically shows an example of a text presented to the end user, with a single row tracking area 501 which is marked-up while the rest of the text is blurred. A heat map 504 is presented showing the detected word by highlighting the detected word. Typically, the heat map highlights the detected word in worm colors tending to red/pink, however, the colors are not shown as the figure is in a black and white format. In this example the single row tracking area 501 shows the sentence "kynan the caterpillar didn't have six legs like all the other caterpillars. He". The detected word is "caterpillar".

According to some embodiments, the method 200 may by optimized by using existing eye-tracking frameworks that support facial postures. According to some embodiments, facial postures detecting leads to producing of accurate eye-gaze data. According to some embodiments, when existing eye-tracking frameworks that support facial postures are used, advantageously no calibration/setup process is required. According to some embodiments, the accurate eye-gaze data is produced even in scenarios where the end user exits the defined calibrated region (head frame.

FIGS. 6A-6B, schematically present examples of measurements that may be generated based on the eye-gazed and audio collected data, according to some embodiments. FIG. 6A shows a reading monotonicity data measurement that is obtained by measuring the time the user's eyes spent on gazing on each word. FIG. 6B shows word decoding and planning times measurement obtained by measuring the difference between the timestamp of a single word gaze detection and a timestamp of a first phoneme pronunciation of the word.

According to some embodiments, other measurements may be obtained from the eye-gaze and audio data collection, which may serve in identifying cognitive disorders such as but not limited to Attention Deficit Disorder (ADD), Attention Deficit Hyperactivity Disorder (ADHD), dyslexia, Reading Comprehension Deficits, Visual Processing Disorders, Reading Speed and Fluency Issues, and the like.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods, according to some embodiments, may be described in a specific sequence, the methods of the disclosure may include some or all of the described stages carried out in a different order. In particular, it is to be understood that the order of stages and sub-stages of any of the described methods may be reordered unless the context clearly dictates otherwise, for example, when a later stage requires as input an output of a former stage or when a later stage requires a product of a former stage. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

Embodiments of the present disclosure may include apparatuses for performing the methods disclosed herein. The apparatuses/systems may be specially constructed for the desired purposes or may include a general-purpose computer (s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

The invention claimed is:

1. A method for eye-gaze location detection, comprising the steps of:

calibrating one or more machine learning models trained to receive one or more images of an eye-gaze of a user on a screen and detect the eye-gaze location on the screen, by constraining an area of interest to a single axis, wherein calibrating the one or more machine learning models comprises:

presenting to the user a plurality of single-axis calibration points on the screen;

for each single-axis calibration point:

capturing by a camera at least one image of the user's eye-gaze looking at the single-axis calibration point; and providing the at least one image to the corresponding machine learning model, thereby calibrating each machine learning model to be constrained to a single-axis area of interest;

calibrating a first machine learning model with x-axis calibration points and a second machine learning model with y-axis calibration points;

presenting to the user one or more lines of words and/or images on the screen;

capturing by the camera one or more images of the user's eye-gaze, looking at said lines of words and/or images;

applying the first and second calibrated machine learning models in parallel on the one or more images of the user's eye gaze looking at said lines of words and/or images, constraining the area of interest to an x-axis for the first machine learning model and a y-axis for the second machine learning model;

detecting an eye-gaze location on the screen with a word-level accuracy for each of the first and second machine learning models; and combining the detected eye-gaze locations from the first and second machine learning models to obtain a single detected eye-gaze location on the screen with increased accuracy.

2. The method of claim 1, wherein the one or more machine learning models are configured to be trained on two-dimensional data.

3. The method of claim 1, wherein the one or more machine learning models are configured to be trained on a single-axis data.

4. The method of claim 1, wherein the word-level accuracy is between 2-3 cm.

5. The method of claim 1, wherein the first machine learning model is configured to be trained on the x-axis and the second machine learning model is configured to be trained on the y-axis.

6. The method of claim 1, wherein the camera is a low resolution and low frame rate camera.

7. The method of claim 1, wherein the camera is a web camera.

8. The method of claim 1, further comprising combining eye-gaze and audio data collection, comprising:

presenting a text to the user with a plurality of lines of words and/or images;

recording a speech sample of the user reading at least one of the presented lines;

measuring a first timestamp of a word detected by the eye-gaze location, and a second timestamp of a first phoneme of the word pronunciation; and comparing the first and second timestamps of the word, providing the time difference between eye-gaze detection and the first phoneme pronunciation, thereby allowing inferring and/or detecting regression disorders.

9. The method of claim 8, wherein the regression disorders are ADD or ADHD, dyslexia, Reading Comprehension Deficits, Visual Processing Disorders and Reading Speed and Fluency Disorders.

10. The method of claim 1, further comprising the step of detecting face position by a facial posture framework and providing the face position as an input to the one or more machine learning models, instead of the step of calibrating the one or more machine learning models.

11. A system for eye-gaze detection, comprising:

a screen;

a camera configured to capture images of a user's eye-gaze looking at the screen; and a processor executing a code configured to:

calibrate one or more machine learning models trained to receive one or more images of an eye-gaze of the user on the screen and detect the eye-gaze location on the screen, by constraining an area of interest to a single axis, wherein calibrating the one or more machine learning models comprises:

presenting to the user a plurality of single-axis calibration points on the screen;

for each single-axis calibration point:

capturing by the camera at least one image of the user's eye-gaze looking at the single-axis calibration point; and providing the at least one image to the corresponding machine learning model, thereby calibrating each machine learning model to be constrained to a single-axis area of interest;

wherein a first machine learning model is calibrated with x-axis calibration points and a second machine learning model is calibrated with y-axis calibration points;

present to the user one or more lines of words and/or images on the screen;

capture by the camera one or more images of the user's eye-gaze, looking at said lines of words and/or images;

apply the first and second calibrated machine learning models in parallel on the one or more captured images of the user's eye gaze looking at said lines of words and/or images, constraining the area of interest to an x-axis for the first machine learning model and a y-axis for the second machine learning model;

detect an eye-gaze location on the screen with a word-level accuracy for each of the first and second machine learning models; and combine the detected eye-gaze locations from the first and second machine learning models to obtain a single detected eye-gaze location on the screen with increased accuracy.

12. The system of claim 11, wherein the one or more machine learning models were trained on two-dimensional data.

13. The system of claim 11, wherein the one or more machine learning models were trained on single axis data.

14. The system of claim 11, wherein the camera is a low resolution and low frame rate camera.

15. The system of claim 11, wherein the camera is a web camera.

16. The system of claim 11, wherein the processor further executes a code for combining eye-gaze and audio data collection, the code is configured to:

present a text to the user with a plurality of lines of words and/or images;

record a speech sample of the user reading at least one of the presented lines;

measuring a first timestamp of a word detected by the eye-gaze location, and a second timestamp of a first phoneme of the word pronunciation; and compare the first and second timestamps of the word, providing the time difference between eye-gaze detection and the first phoneme pronunciation, thereby allowing inferring and/or detecting regression disorders.

17. The system of claim 11, further comprising a facial posture framework for detecting face position wherein the code is configured to receive the face position as an input to the one or more machine learning models, instead of calibrating the one or more machine learning models.

* * * * *